(12) United States Patent
Kfir et al.

(10) Patent No.: US 11,182,365 B2
(45) Date of Patent: Nov. 23, 2021

(54) SYSTEMS AND METHODS FOR DISTRIBUTED STORAGE OF DATA ACROSS MULTIPLE HASH TABLES

(71) Applicant: MELLANOX TECHNOLOGIES TLV LTD., Raanana (IL)

(72) Inventors: Aviv Kfir, Nili (IL); Benny Koren, Zichron Yaakov (IL); Gil Levy, Hod Hasharon (IL); Barak Gafni, Kfar Malal (IL)

(73) Assignee: Mellanox Technologies TLV Ltd., Raanana (IL)

(*) Notice: Subject to any disclaimer, the term of this patent is extended or adjusted under 35 U.S.C. 154(b) by 594 days.

(21) Appl. No.: 15/075,936

(22) Filed: Mar. 21, 2016

(65) Prior Publication Data
US 2017/0270119 A1    Sep. 21, 2017

(51) Int. Cl.
*G06F 16/22* (2019.01)
*H04L 9/08* (2006.01)
*H04L 9/06* (2006.01)

(52) U.S. Cl.
CPC ........ *G06F 16/2255* (2019.01); *H04L 9/0643* (2013.01); *H04L 9/0894* (2013.01)

(58) Field of Classification Search
CPC ............. G06F 17/3033; G06F 16/2255; H04L 9/3242; H04L 9/0643; H04L 9/0894
USPC .......................................................... 707/747
See application file for complete search history.

(56) References Cited

U.S. PATENT DOCUMENTS

| | | | | |
|---|---|---|---|---|
| 6,128,627 A * | 10/2000 | Mattis | ................... | G06F 16/221 |
| 6,389,123 B1 * | 5/2002 | Hung | ................... | H04M 15/41 |
| | | | | 379/127.01 |
| 7,031,985 B1 * | 4/2006 | Pecheny | ........... | G06F 16/90344 |
| 7,990,979 B2 * | 8/2011 | Lu | ........................... | H04L 45/54 |
| | | | | 370/395.32 |
| 8,037,076 B2 * | 10/2011 | Schneider | ........... | G06F 16/9014 |
| | | | | 707/747 |
| 8,484,439 B1 * | 7/2013 | Frailong | ................. | G06F 12/06 |
| | | | | 711/216 |
| 8,577,850 B1 * | 11/2013 | Genda | ................. | G06F 11/1453 |
| | | | | 707/692 |
| 9,239,852 B1 * | 1/2016 | Lutz | ....................... | G06F 16/278 |
| 9,256,549 B2 * | 2/2016 | Kimmel | ................ | G06F 3/0611 |
| 9,979,648 B1 * | 5/2018 | Singh | ................... | H04L 45/7453 |
| 10,067,967 B1 * | 9/2018 | Bosshart | ............. | G06F 16/2255 |

(Continued)

*Primary Examiner* — Tony Mahmoudi
*Assistant Examiner* — Michael Le
(74) *Attorney, Agent, or Firm* — Alston & Bird LLP

(57) ABSTRACT

Systems and methods are described that provide for distributively storing and accessing data across multiple hash tables, such that utilization of the hash tables is optimized. In particular, a key associated with a value is split into two or more sub-keys and the sub-keys are inserted into respective hash tables with associated values. For each sub-key except the final sub-key derived from a particular key, the value paired with the sub-key is an identifier that points to the location of the next sub-key and its associated value, which may be stored in the other hash tables. The final sub-key derived from the original key is paired with the value associated with the key, such as an action to be performed. Thus, rather than using a single key (which may be very large) to access or store a particular value, multiple (smaller) sub-keys are used to ultimately access the same value via multiple, smaller hash tables.

15 Claims, 6 Drawing Sheets

(56) References Cited

U.S. PATENT DOCUMENTS

| | | | | |
|---|---|---|---|---|
| 2002/0087500 A1* | 7/2002 | Berkowitz | .......... | G06F 16/2365 |
| 2003/0210689 A1* | 11/2003 | Davis | .................... | H04L 45/745 |
| | | | | 370/389 |
| 2004/0148284 A1* | 7/2004 | Baker | .................... | G06F 40/274 |
| 2006/0179071 A1* | 8/2006 | Panigrahy | ......... | G06F 17/30949 |
| 2007/0286194 A1* | 12/2007 | Shavitt | ................. | H04L 45/745 |
| | | | | 370/392 |
| 2011/0145260 A1* | 6/2011 | Ichino | ................. | G06F 16/9014 |
| | | | | 707/747 |
| 2012/0246163 A1* | 9/2012 | Liu | ........................ | H04L 45/38 |
| | | | | 707/737 |
| 2013/0060815 A1* | 3/2013 | Saeki | ..................... | G06F 16/27 |
| | | | | 707/802 |
| 2013/0185537 A1* | 7/2013 | Abali | .................... | G06F 16/137 |
| | | | | 711/216 |
| 2013/0287207 A1* | 10/2013 | Zaverucha | ............ | H04L 9/3236 |
| | | | | 380/44 |
| 2014/0310307 A1* | 10/2014 | Levy | .................. | H04L 45/7453 |
| | | | | 707/769 |
| 2016/0124950 A1* | 5/2016 | Tanaka | ................ | G06F 16/9014 |
| | | | | 707/747 |

\* cited by examiner

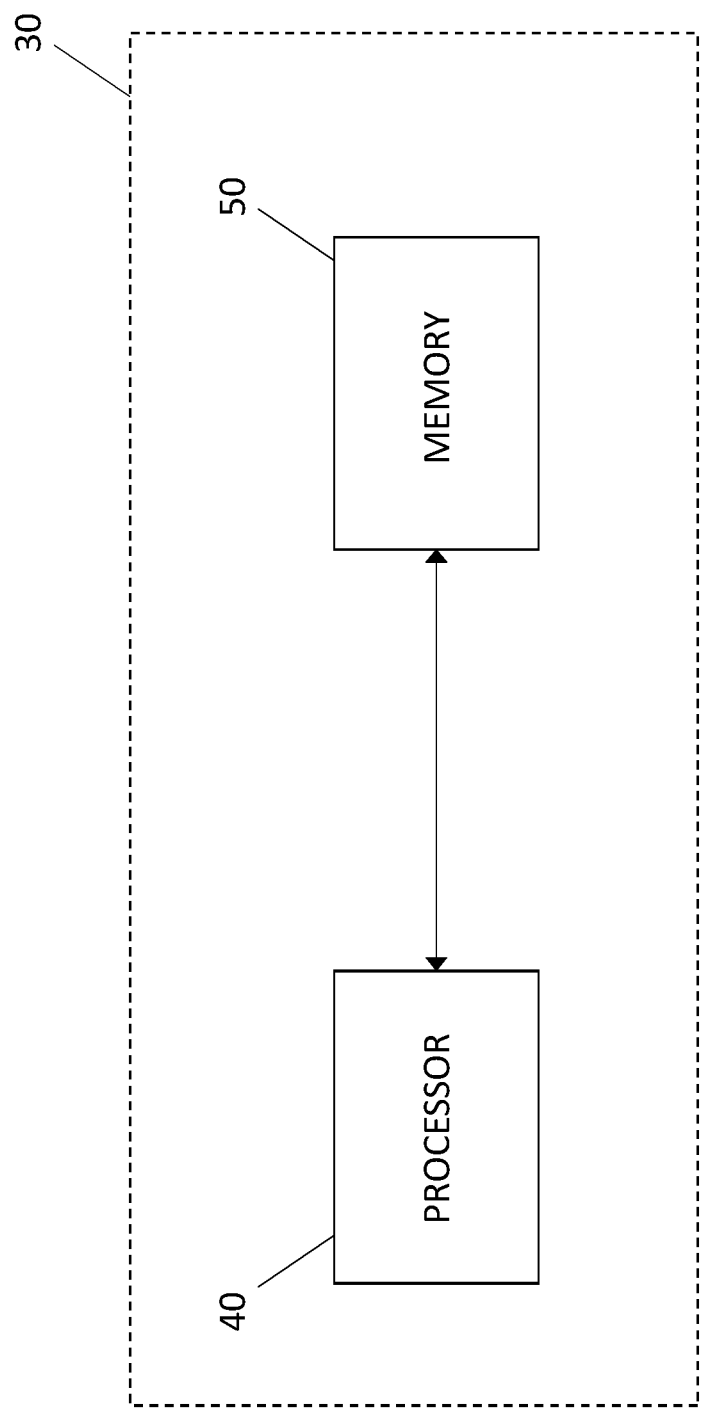

SYSTEMS AND METHODS FOR DISTRIBUTED STORAGE OF DATA ACROSS MULTIPLE HASH TABLES

BACKGROUND

The present disclosure relates in general to storing data in hash tables. In particular, systems and methods of optimizing the use of cuckoo hash tables by storing data across multiple hash tables are described.

Hash tables are often used in computing applications to store data. Data stored in a hash table can later be accessed for executing various operations.

Different types of hash tables provide different ways to insert data, access stored data, and resolve collisions. In the digital age, however, the amount of data needing to be stored has increased, and the complexity of operations to be performed with such data has likewise grown.

BRIEF SUMMARY

Embodiments of the invention described herein therefore provide improved systems and methods for storing data in hash tables and accessing stored data from hash tables in a way that optimizes the use of such hash tables and increases efficiency. In particular, embodiments of the invention provide a mechanism for distributed storage of data across multiple hash tables by splitting a key (e.g., data associated with a value to be stored in the hash table) into two or more sub-keys and inserting the sub-keys into respective hash tables with identifiers that point to the associated sub-keys stored in the other hash tables. In such a way, each sub-key leads to the following sub-key, with the final sub-key of the key being paired with a value (e.g., an action to be performed) that is sought.

Accordingly, in some embodiments, a method of searching hash tables is provided, where the method comprises receiving a key, the key comprising at least a first sub-key and a second sub-key. The method further comprises accessing a first hash table based on application of a first hash function to the first sub-key, searching the first hash table using the first sub-key, and in response to locating the first sub-key in the first hash table, concatenating an identifier, associated with the first sub-key, with the second sub-key to create a concatenated second sub-key. The method further comprises accessing a second hash table based on application of a second hash function to the concatenated second sub-key, searching the second hash table using the concatenated second sub-key, and in response to locating the concatenated second sub-key in the second hash table, obtaining a value associated with the concatenated second sub-key.

In some embodiments, the first hash table may comprise an entry, and the entry may comprise the first sub-key and the identifier. Additionally, the second hash table may comprise an entry, and the entry may comprise the concatenated second sub-key and the value, wherein the value comprises an action to be performed. In some cases, the key comprises a first sub-key, a second sub-key, and a third sub-key.

The key may be split into sub-keys such that a width of an entry comprising the first sub-key is equal to a width of an entry comprising the second sub-key. Moreover, the hash table may be a cuckoo hash table. The key may comprise one of an Internet Protocol (IP) address, a media access control (MAC) address, an MPLS label, a tunnel, a social ID, or a name.

In other embodiments, a method of inserting a value into a hash table is provided, where the method includes splitting a key associated with a value into at least a first sub-key and a second sub-key, accessing a first hash table based on application of a first hash function to the first sub-key, and, in response to identifying an open position of the first hash table, inserting the first sub-key into the open position of the first hash table. An identifier is then associated with the first sub-key, and the identifier is concatenated with the second sub-key. A second hash table is accessed based on application of a second hash function to the concatenated second sub-key. In response to identifying an open position of the second hash table, the concatenated second sub-key is inserted into the open position of the second hash table, and the value associated with the key is inserted into the open position of the second hash table.

In some cases, associating the identifier with the first sub-key may comprise populating the open position of the first hash table with the first sub-key and the identifier, and the value associated with the key may comprise an action. Additionally, in some cases, splitting the key may comprise splitting the key into at least a first sub-key, a second sub-key, and a third sub-key. Moreover, in some embodiments, splitting the key may comprise splitting the key such that a width of an entry comprising the first sub-key is equal to a width of an entry comprising the second sub-key.

In response to identifying no open position in the first hash table, in some cases an entry may be removed from a populated position of the first hash table to create an open position, the first sub-key may be inserted into the open position of the first hash table, and the identifier may be associated with the first sub-key. A different hash function may be applied to the removed entry, and a different hash table may be accessed in response to applying the different hash function to the removed entry. In response to identifying an open position of the different hash table, the removed entry may be inserted into the open position of the different hash table.

In some embodiments, in response to identifying no open position in the second hash table, an entry may be removed from a populated position of the second hash table to create an open position; the concatenated second sub-key may be inserted into the open position of the second hash table; and the value associated with the key may be inserted into the open position of the second hash table. A different hash function may be applied to the removed entry, and a different hash table may be accessed in response to applying the different hash function to the removed entry. In response to identifying an open position of the different hash table, the removed entry may be inserted into the open position of the different hash table.

In some cases, the first hash table may be searched using the first sub-key, and in response to locating the first sub-key in the first hash table, an identifier may be determined that is pre-associated with the first sub-key via the first hash table. The identifier may be concatenated with the second sub-key to create the concatenated second sub-key, such that multiple keys share the same entry of the first hash table. The key may comprise one of an Internet Protocol (IP) address, a media access control (MAC) address, an MPLS label, a tunnel, a social ID, or a name.

In still other embodiments, an array of hash tables may be provided for storing a value associated with a key. The array of hash tables may comprise a first hash table associated with a first hash function, where the first hash table is configured to store a first sub-key, and an identifier associated with the first sub-key; a second hash table associated with a second hash function, where the second hash table is configured to store a second sub-key concatenated with the identifier; and a value associated with the key. The key comprises the first sub-key and the second sub-key.

An available width of an entry of the first hash table and an available width of an entry of the second hash table may, in some cases, be selected such that a width of the first sub-key plus a width of the identifier is equal to a width of the concatenated second sub-key plus a width of the action. Moreover, in some cases, the array of hash tables may be cuckoo hash tables. In some embodiments, the key may comprise one of an Internet Protocol (IP) address, a media access control (MAC) address, an MPLS label, a tunnel, a social ID, or a name.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

FIG. 6 illustrates an apparatus configured to implement embodiments of the invention according to an example embodiment.

DETAILED DESCRIPTION OF THE DRAWINGS

The present invention now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
FIG. 1 is a schematic illustration of applying a hash function to a key for indexing to a hash table according to an example embodiment.

The use of hash tables, or "hashing," allows users to store and access data in a more efficient manner than, for example, the use of search trees and other data lookup structures. In hashing, a key 5 is mapped to a value stored in a hash table 10, as illustrated in FIG. 1. A hash function is used to index the key 5, such that a particular entry in a hash table 10 may be determined for initially storing the key and its associated value or later accessing the stored value.

In a 1-way hash table, a single hash function is used, and the value of the hash on the key is the bucket number. The number of buckets in this case depends on how many entries one wants to store in the hash table, and each bucket contains only one entry, where the entry comprises the key and the action to be performed.

In a 4-way hash table, a single hash function is used, and the value of the hash on the key is the bucket number. In a 4-way hash table, however, each bucket contains 4 entries. When a key and action are inserted into a 4-way hash table, the bucket is determined, or calculated, according to the hash, and the bucket is searched to identify a free entry out of the 4 possible entries within which to insert the data. Similarly, in a search scenario, the bucket is determined according to the hash, and the search key is compared to the keys of the 4 entries in that bucket (if all 4 entries are full) to determine the entry having a key value that matches the searched key. Once the matching entry is found, the associated action can be accessed. The total number of entries in a 4-way hash table is the number of buckets multiplied by 4. Thus, when constructing the hash function for a 4-way hash table, a user would typically construct the hash table to have ¼ of the buckets as compared to the number of buckets in a 1-way hash table in order to have exactly the same amount of entries.

Accordingly, in a scenario in which 4 hash tables are provided, each being a 1-way hash table, there would be four hash functions, and each hash function would be used to access a particular hash table. In other words, the hash function Hash1 (for example) would be for Table 1; the hash function Hash2 would be for Tablet2; Hash3 for Table3; and Hash4 for Table4. The number of buckets in each hash table is determined by the hash function, and it is the same number for each of the hash tables. Because each of the hash tables is a 1-way hash table, each bucket would have only a single entry. For insertion, 4 hash functions would be applied to the same key to determine 4 different buckets (thus, 4 different entries), 1 in each hash table. The data would then be inserted in one of the 4 locations that is free. For a search operation, 4 hash functions would be applied to the key, and the key stored in each of the resulting 4 entries would be compared to the searched key to find a match. The total number of entries in this scenario is the number of buckets in each hash table multiplied by 4 hash tables. This scheme (4 1-way hash tables) may also be referred to as a 4-way hash table because the total number of possible locations for a given key is 4. Dividing the entries into 4 1-way hash tables, however, provides a more effective mechanism in terms of utilization of available entries and can also be combined with cuckoo hashing when inserting a new key, as described in greater detail below.

If 4 hash tables are used, each being a 2-way hash table, again there would be four hash functions, and each hash function would be used to access a particular hash table, and the number of buckets in each hash table would be determined by the hash function. Each bucket in this case, however, would hold 2 entries. Thus, 4 2-way hash tables would be equivalent to an 8-way hash table that is divided into 4 different hash tables, where each hash table has its own hash function, as described above.

To use a very simple example, the names in a phone book may be considered keys, and each key (e.g., a person's name) may be associated with a value that is the person's telephone number. A hash table in this example may, for the purposes of explanation, include 26×26"buckets," or positions in which entries (e.g., the name-number pairs) may be stored, as depicted in FIG. 1, where the 26×26$^{th}$ bucket is represented by N. The hash function in this simple example may take the person's name (e.g., First name/Last name) and index it to a two-letter combination made up of the person's first initial combined with the person's last initial. For example, the key of Jane Doe, after application of the example hash function, may be indexed to JD, and thus Jane Doe's phone number would be stored in the bucket of the hash table called JD, such as in one of the positions P1-PN in the depicted example.

The structure of the hash table 10 in FIG. 1 includes 26×26 buckets (e.g., because there are 26 possibilities for the first initial and 26 possibilities for the second initial, there being 26 letters in the English alphabet), and each bucket has a single entry (e.g., a single phone number-name pair), thus making it a 1-way hash table. As described above, the particular bucket in which the data may be found within the hash table is determined based on the hash function. Once in the proper bucket, each entry must be searched to identify the entry containing the matching key for a search operation, or an available entry for an insertion operation.

Hash tables, however, may be structured in various different configurations, as noted above. In some cases, for example, hash tables may be structured to have more than 4 ways, such as 6 or 8 or more ways. Above a certain number of ways, however, the efficiency of searching the number of entries within the identified bucket of the hash table decreases to the point at which the benefits of using a hash table to begin with no longer exist. In other examples, however, the hash tables may be constructed such that fewer than 4 ways are used, such as in a 2-way hash table or a 1-way hash table. Moreover, the hash function used for indexing a key 5 to its respective hash table 10 may vary depending on the type of data being hashed, the structure of the hash table, the hashing scheme (e.g., the method used for resolving collisions), and other data processing considerations.

Figure 2:
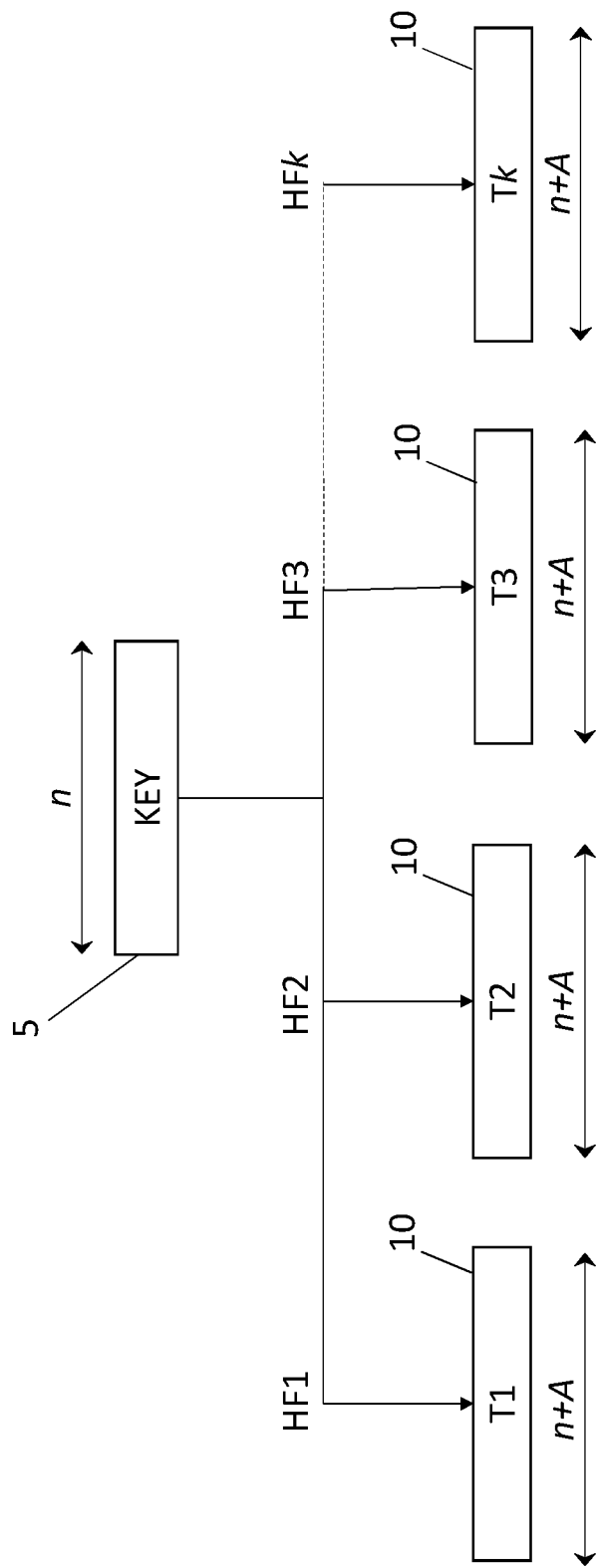
FIG. 2 is a schematic illustration of applying multiple hash functions to a key for indexing to a hash table according to an example embodiment.

With reference now to FIG. 2, in some cases multiple hashing functions may be used to index a particular key 5 to a particular bucket of a hash table 10. In FIG. 2, k hash functions (e.g., HF1 through HFk) may be applied to the key 5 to index the key to one of the buckets in the depicted k hash tables 10 (e.g., tables T1 through Tk). In this example, each hash table 10 may be structured as a 1-way hash table, such that each of the buckets in the hash table can only hold one entry (e.g., one key-value pair). For example, k may be equal to an integer such as 2, 3, 4, 5, 6, 7, 8, or more. In a case in which k is equal to 8, for example, 8 different hash functions (HF1 through HF8) may be applied to the key 5, and as a result one of the buckets in each of the 8 different hash tables (T1 through T8) may be accessed to either (1) in an insertion scenario, search for an open position for inserting a respective entry or (2) in an extraction scenario, obtain the value associated with the searched key. As depicted, the k hash tables (e.g., HF1 through HFk) may be accessed in parallel in this scenario, thereby reducing the time needed to perform the insertion or extraction. In an insertion scenario in which buckets in multiple hash tables 10 are identified as having an open space, only one of the hash functions may be selected for storing the data, such as according to a prioritization scheme or other mechanism.

As shown in FIG. 2, in conventional hashing scenarios, each hash table 10 must be sized to accommodate the widest key to be hashed. For example, if the hash table 10 in this example is configured to hold a combined width equal to a width of the key and its associated value, the hash table must be sized to have a width large enough to hold both a width of the key and a width of the key's associated value. In the depicted example of FIG. 2, where the key 5 has a width of n and the value is an action that has a width of A, then each hash table 10 should have a width that is at least equal to n+A. In real terms, such as in the context of networking applications, the key may be an Internet Protocol (IP) address or a media access control (MAC) address, and the value may be an action that should be performed with respect to the IP address or the MAC address (e.g., an action that describes how to transmit data from one point in the network to another using the IP address or the MAC address). In still other cases, the key may be an MPLS label, a tunnel, a social ID, a names, etc. Considering the width of IP addresses and MAC addresses as an example (e.g., how much memory is required to store the addresses, which may be 32 to 48 bits) and the width of the associated value that would need to be stored in the respective hash table 10, the hash tables may need to be sized to a width of about 100 bits or 160 bits or more. The larger the width of a hash table 10, however, the more memory is needed to store the key-value combination as an entry in the table. As a result, short key-value combination have poor utilization of the available space (width) of the entry, with the utilization percentage being equal to the size of the shortest key-value combination divided by the size of widest key-value combination.

Figure 3:
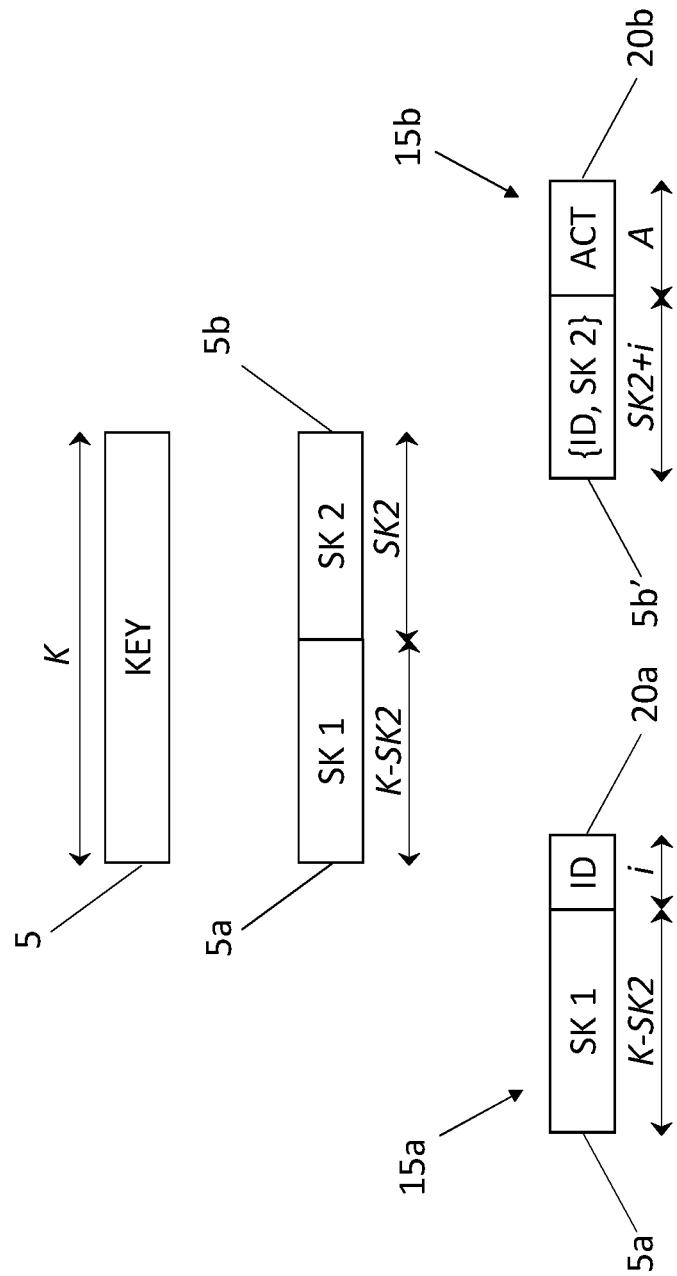
FIG. 3 illustrates splitting a key into multiple sub-keys and creating entries for hash tables using the sub-keys according to an example embodiment.
Figure 4:
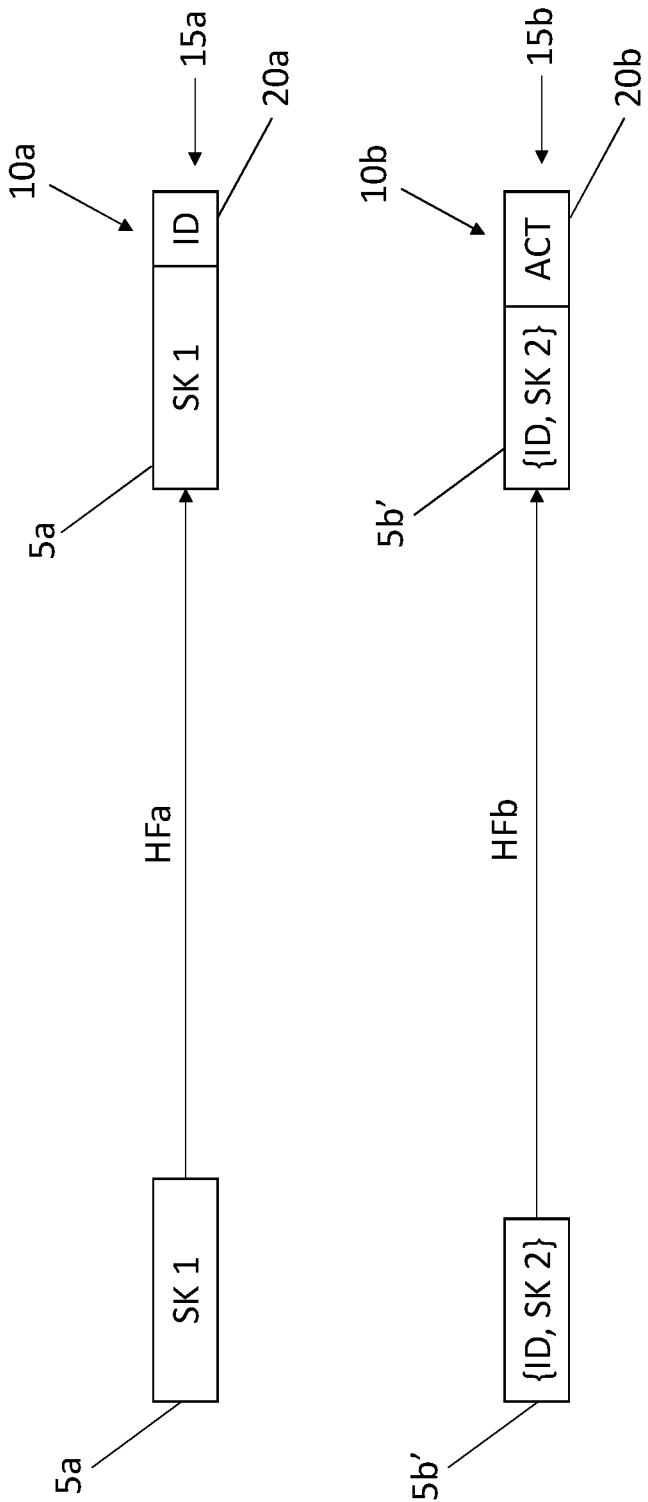
FIG. 4 is a schematic illustration of applying a first hash function to a first sub-key for indexing to a first hash table and applying a second hash function to a concatenated second sub-key for indexing to a second hash table according to an example embodiment.

Accordingly, with reference to FIGS. 3 and 4, embodiments of the invention provide a mechanism for distributively storing and accessing data across multiple hash tables, such that the width of each hash table is decreased. In particular, embodiments of the invention provide for the splitting of a key into two or more sub-keys and inserting the sub-keys into respective hash tables with associated values. For each sub-key except the final sub-key derived from a particular key, the value paired with the sub-key is an identifier that points to the location of the next sub-key and its associated value, which may be stored in the other hash tables. The final sub-key derived from the original key is paired with a value associated with the key, such as an action to be performed. Thus, according to the described embodiments, rather than using a single key (which may be very large) to access or store a particular value, multiple (smaller) sub-keys are used to ultimately access the same value via multiple hash tables.

Considering an insertion scenario, a value associated with a given key 5 may need to be stored in a hash table. For example, the key 5 may be an IP address or a MAC address, and the value may be an action to be performed with respect to the IP address or MAC address for a networking application. Referring to FIG. 3, for example, embodiments of the invention may receive the key 5 and split the key into a first sub-key 5a and a second sub-key 5b. In this regard, although the depicted example shows a key 5 being split into only two sub-keys 5a, 5b, it will be understood by one skilled in the art in view of the present disclosure that the key may be split into more than two sub-keys, such as three or more sub-keys.

A first hash function HFa (shown in FIG. 4) may be applied to the first sub-key 5a, and a first hash table 10a may be accessed based on the application of the first hash function to the first sub-key, where the first hash table 10a may be one or more of a number of available hash tables. In response to identifying that there is an open position in the first hash table 10a, she first sub-key 5a may be inserted into the open position of the first hash table. Moreover, an identifier ID may be associated with the first sub-key 5a, such as by populating the open position of the first hash table with the first sub-key and the identifier. In FIG. 4, the first hash table 10a is shown after an entry 15a comprising the first sub-key 5a and the identifier ID (which forms the value 20a for the respective entry of the first hash table 10a) have been used to populate the (formerly) open position depicted. The identifier ID may be automatically generated as a unique value, such that each sub-key has a different identifier ID. Accordingly, insertion and extraction operation using such unique identifiers will result in the correct entry being identified.

Next, the identifier ID may be concatenated with the second sub-key 5*b*, so as to form a new, concatenated second sub-key represented in FIGS. 3 and 4 as {ID, SK2}. Although the depicted example shows the concatenated second sub-key 5*b*' as being {ID, SK2}, the concatenation may be done in other ways, such as by placing the second sub-key in front of the identifier (e.g., {SK2, ID}). Turning again to FIG. 4, a second hash table 10*b* (where the second hash table 10*b* may be one or more of a number of available hash tables) may be accessed based on application of a second hash function HFb to the concatenated second sub-key 5*b*. The second hash table 10*b* may be a different hash table than the first hash table 10*a*, but in some cases the second hash table may be the same hash table in which the first sub-key 5*a* is stored, e.g., the first hash table 10*a*, such as in a case in which the first hash table has multiple buckets.

In response to identifying an open position of the second hash table 10*b*, the concatenated second sub-key 5*b*' may be inserted into the open position of the second hash table 10*b*, and the value 20*b* associated with the key may be entered into the open position of the second hash table. Thus, the entry 15*b* may include the concatenated second sub-key 5*b*' and the value 20*b*, as shown in FIG. 4. For example, in cases in which the value 20*b* associated with the key 5 comprises an action ACT, the entry 15*b* would comprise the concatenated second sub-key 5*b*' and the action ACT.

Although for ease of explanation embodiments of the invention are described as applying a "first" hash function and a "second" hash function to the first sub-key and the second sub-key, respectively, it is understood in light of this disclosure that multiple hash functions may serve as the first hash function, and multiple hash functions may serve as the second hash function. For example, where multiple hash tables are involved (MHT), the keys may be hashed using all of the hash functions (e.g., HF1 . . . HFk, where k is the number of hash tables). As such, in embodiments in which the hash tables are configured as 1-way, one entry per bucket hash tables, multiple hash functions may be applied to the first sub-key (e.g., in parallel), with one of the hash functions indexing the first sub-key to a bucket in the first hash table, as described above with respect to FIG. 2. Likewise, multiple hash functions may be applied to the second sub-key (e.g., in parallel), with one of the hash functions indexing the concatenated second sub-key to a bucket in the second hash table.

In some embodiments, the key 5 is split it in a way that results in each sub-key+identifier ID and action ACT combination is no wider than the width of the entry of the hash table. Each hash table, in turn, must have the same width to allow each key-value combination to fit in any of the entries. For example, one way to accomplish this goal is to split the key 5 such that a width of the entry containing the first sub-key 5*a* is equal to a width of the entry containing the second sub-key 5*b* (e.g., so that the entries consume the same number of bits). In such embodiments, the placement of sub-keys into the hash tables has no width constraints, and each entry 15*a*, 15*b* can be inserted in any bucket of any hash table.

In order to do this, and with reference to FIG. 3, the formula below may be used to determine an appropriate width of the first and second sub-keys (where K is the width of the key, SK2 is the width of the second sub-key, i is the width of the identifier, and A is the width of the action):

$$K-SK2+i=SK2+i+A$$

Solving for SK2, SK2=(K−A)/2.

For example, where the key is 100 bits wide (K=100) and the action is 20 bits wide (A=20), the key may be split into sub-keys such that the second sub-key would have a width of (K−A)/2, or (100−20)/2=40 bits. The width of the first sub-key would be K−SK2, or 100−40, which equals 60 bits. The resulting width of each entry would thus be 100−40+ i=40+i+20 bits. In this way, both entries would have a width of 60 bits+i.

In addition to the example provided above, in some embodiments, it may be desirable to split the key in other ways. For example, in some cases, only certain types of keys may be split for distributive storage in multiple hash tables according to embodiments of the invention as described above, while other types of keys are not split. In such cases, the constraint on the width of the entries may be the width of the particular type of key that is not split into sub-keys.

Moreover, in some embodiments, the methods and systems described herein may be implemented in the context of a cuckoo hashing scheme. For example, in a case where no open position is identified in the first hash table 10*a* for insertion of the first sub-key 5*a*, an entry may be removed from a populated position of the first hash table to create an open position. The first sub-key 5*a* may then be inserted into the newly-created open position of the first hash table, and the identifier ID may be associated with the first sub-key, such as by inserting the identifier ID as a value 20*a* in an entry 15*a* of the first hash table 10*a*, as described above. A different hash function (which may be all of the hash functions, in parallel, such as HFc, not shown) may be applied to the removed entry, and in response a different hash table (or a number of different hash tables in parallel, according to the hash functions, respectively) may be accessed. If an open position of the different hash table is identified, then the removed entry may be inserted into that open position. If, on the other hand, that different hash table does not have an open entry, the entry that is already populating that different hash table may be replaced with the previously removed entry, and the process may repeat until an open position is found according to a cuckoo hashing scheme.

Similarly, in an instance in which no open position is identified in the second hash table 10*b* (e.g., for placement of the concatenated second sub-key 5*b*'), regardless of the process used to place the first sub-key 5*a*, an entry may be removed from a populated position of the second hash table to create an open position. The concatenated second sub-key 5*b*' may then be inserted into the newly-created open position of the second hash table, and the value 20*b* associated with the key 5 may be inserted into the open position of the second hash table 10*b*, as described above. Again, a different hash function may be applied to the removed entry, and in response a different hash table may be accessed. If an open position of the different hash table is identified, then the removed entry may be inserted into that open position. If, on the other hand, that different hash table does not have an open entry, the entry that is already populating that different hash table may be replaced with the previously removed entry, and the process may repeat until an open position is found according to a cuckoo hashing scheme.

Because keys 5 are split into sub-keys 5*a*, 5*b* and are distributively stored with their respective values (e.g., identifiers and actions) across multiple hash tables based on the application of multiple hash functions, there may be instances in which the first sub-key 5*a* of a particular key 5 is the same as the first sub-key of a different key. For example, in a case where the key is an IP address, the first half of one IP address may be identical to the first half of another IP address, even though the two IP addresses when considered in their entirety are not identical (e.g., the second halves are different). In such cases, embodiments of the methods and systems described herein make use of a pre-existing entry for the first sub-key, rather than store a new, identical entry for the identical first sub-key.

Figure 5:
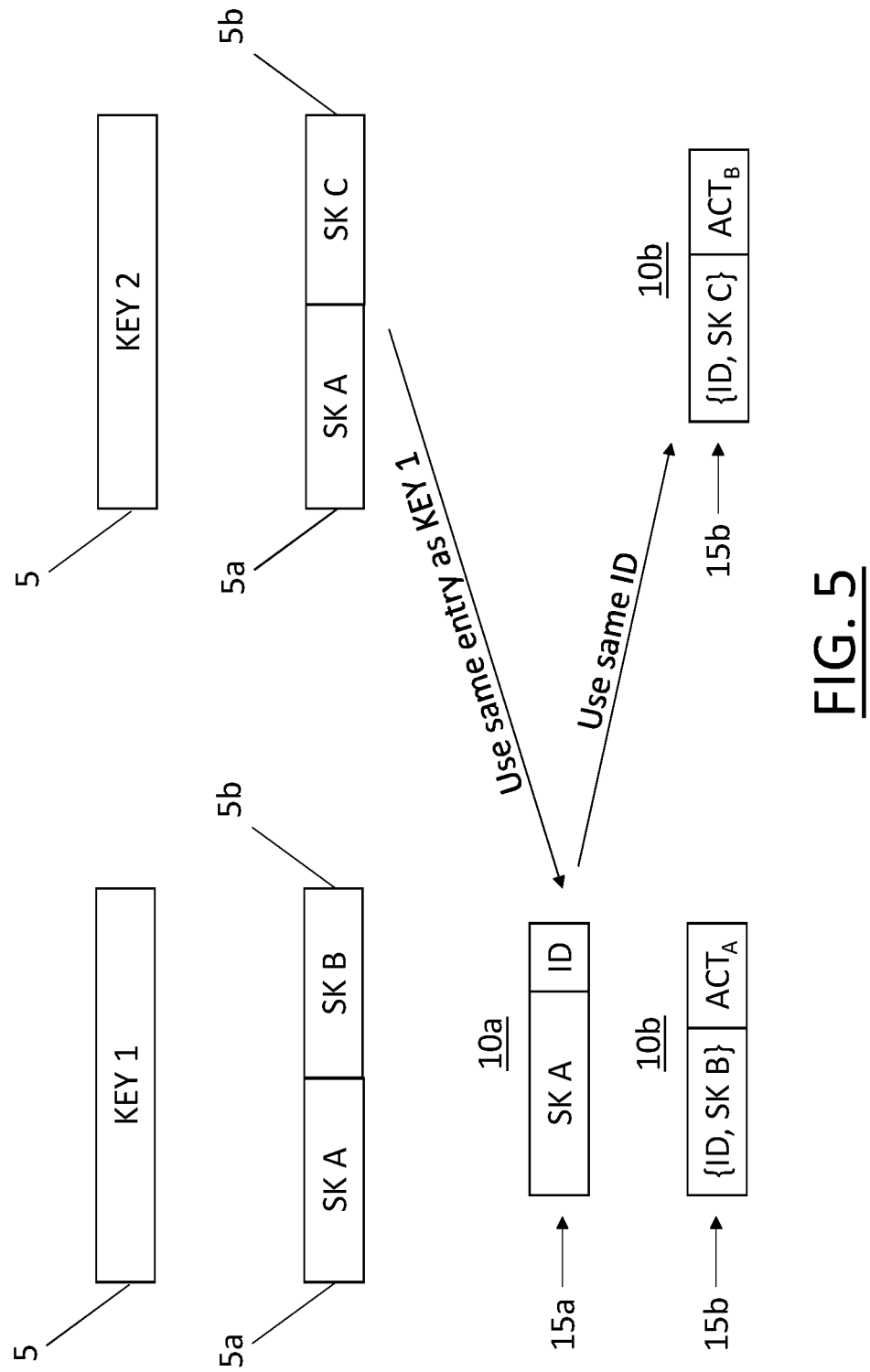
FIG. 5 illustrates use of pre-existing entries for identical first sub-keys of different keys to create efficiencies according to an example embodiment.

In this regard, the (subsequent, yet identical) first sub-key 5a may be used to search the first hash table 10a. In response to locating the first sub-key 5a in the first hash table 10a (e.g., indicating that the same first sub-key was previously stored during an insertion process for a different key 5), the identifier associated with the existing, previously stored first sub-key may be concatenated with the second sub-key 5b (which is different from the second sub-key associated with the previously existing first sub-key that was identified). The concatenated second sub-key 5b' that is created will thus be unique and can be stored in the second hash table with the value 20b associated with the key as described above and shown in FIG. 4. In this way, multiple keys 5 may be able to share the same first entry of the first hash table, thereby reducing the amount of space needed in the hash tables for storage of the data. This is illustrated in FIG. 5, in which the first sub-key of both Key 1 and Key 2 are identical (represented as SK A). Thus, as shown, both keys can make use of the same first entry 15a in the first hash table 10a, as the same ID is used for concatenating with the subsequent second sub-key SK C.

In other embodiments, a method of searching hash tables is provided, where a value associated with a key has been distributively stored using multiple hash tables, as described above. In particular, a key 5 may be received (e.g., by a processor 40 shown in FIG. 6 and described below), where the key comprises at least a first sub-key 5a and a second sub-key 5b. The first and second sub-keys 5a, 5b may be received as first and second sub-keys, or the system may be configured to split the key 5 that is received into first and second sub-keys according to the same process used to split the key into sub-keys when originally storing the data in the hash tables. For example, in some cases, the key 5 may be split such that a width of the entry including the first sub-key is equal to a width of the entry including the second sub-key, as described above. In other cases, instead of being split into two sub-keys, the key may be split into three sub-keys (e.g., a first sub-key, a second sub-key, and a third sub-key), as described above, and/or some types of keys may not be split at all.

A first hash table 10a may be accessed based on application of a first hash function to the first sub-key 5a. The first hash table 10a may then be searched using the first sub-key 5a. In response to locating the first sub-key 5a in the first hash table 10a, an identifier ID that is associated with the first sub-key 5a may be concatenated with the second sub-key 5b to create a concatenated second sub-key 5b'. For example, as described above, the identifier ID may be the value 20a that is found in the first hash table 10a (e.g., the identifier forming part of the entry 15a that was stored in the first hash table, along with the first sub-key 5a, as illustrated in FIG. 4). A second hash table 10b may then be accessed based on application of a second hash function to the concatenated second sub-key 5b'. The concatenated second sub-key 5b' may in turn be used to search the second hash table 10b, and in response to locating the concatenated second sub-key in the second hash table, a value 20b associated with the concatenated second sub-key may be obtained. For example, the second hash table 10b may comprise an entry 15b, and the entry may comprise the concatenated second sub-key 5b' and the value 20b. As described above, in the networking applications in which the keys 5 comprise IP addresses and/or MAC addresses, etc., the value 20b associated with the concatenated second sub-key 5b' may be an action to be performed.

Accordingly, embodiments of the methods and systems described above provide an array of hash tables for storing values associated with keys. As described above and depicted in the referenced figures, the array of hash tables may comprise a first hash table associated with a first hash function, wherein the first hash table is configured (e.g., is able) to store a first sub-key and an identifier associated with the first sub-key. Thus, the first hash table may include an entry comprising the first sub-key and the identifier associated with the first sub-key, such as depicted in FIG. 4. The array of hash tables may further comprise a second hash table associated with a second hash function. The second hash table may be configured to store a second sub-key that is concatenated with the identifier from the first hash table, as well as a value associated with the key. Thus, the second hash table may include an entry that comprises the concatenated second sub-key and the value associated with the key. In this regard, the key comprises the first sub-key and the second sub-key, as described above. As noted above, although the terms "first" and "second" hash functions and hash tables are used, it is understood that multiple hash functions may be applied to a key or sub-key in parallel to access multiple hash tables for finding available entries for insertion or matching entries for extraction.

For example, as described above with reference to FIG. 3, a width of the entry including the first sub-key may be equal to a width of the entry including the second sub-key. The key may, e.g., in the context of networking applications, comprise one of an Internet Protocol (IP) address, a media access control (MAC) address, an MPLS label, a tunnel, a social ID, a names, etc. Moreover, the array of hash tables in some embodiments may be configured as cuckoo hash tables.

Embodiments of the methods and systems described above can be implemented in various ways in various types of networking environments. For example, with reference to FIG. 6, an apparatus 30 configured to implement embodiments of the invention described herein may comprise a processor 40 and a memory 50. The processor 40 (and/or co-processors or any other processing circuitry assisting or otherwise associated with the processor 40) may be in communication with the memory 50 via a bus for passing information among components of the apparatus 30 and/or system of apparatuses, such as a network of servers in a networking application. The memory 50 may include, for example, one or more volatile and/or non-volatile memories. In other words, for example, the memory 50 may be an electronic storage device (e.g., a computer readable storage medium) comprising gates configured to store data (e.g., bits) that may be retrievable by a machine (e.g., a computing device like the processor 40). The memory 50 may be configured to store information, data, content, applications, instructions, or the like for enabling the apparatus and/or system to carry out various functions in accordance with an example embodiment of the present invention. For example, the memory 50 may be configured to buffer input data for processing by the processor 40. Additionally or alternatively, the memory 50 may be configured to store instructions for execution by the processor 40. Moreover, the first and second hash tables described above may reside in the memory 50.

The apparatus 30 may, in some embodiments, be a server or a fixed communication device or computing device configured to employ an example embodiment of the present invention. However, in some embodiments, the apparatus 30 may be embodied as a chip or chip set. In other words, the apparatus 30 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 30 may therefore, in some cases, be configured to implement an embodiment of the present invention on a single chip or as a single "system on a chip."

The processor 40 may be embodied in a number of different ways. For example, the processor 40 may be embodied as one or more of various hardware processing means such as a coprocessor, a microprocessor, a controller, a digital signal processor (DSP), a processing element with or without an accompanying DSP, or various other processing circuitry including integrated circuits. As such, in some embodiments, the processor 40 may include one or more processing cores configured to perform independently. A multi-core processor may enable multiprocessing within a single physical package. Additionally or alternatively, the processor 40 may include one or more processors configured in tandem via the bus to enable independent execution of instructions, pipelining and/or multithreading.

In an example embodiment, whether configured by hardware or software methods, or by a combination thereof, the processor 40 may represent an entity (e.g., physically embodied in circuitry) capable of performing operations according to an embodiment of the present invention while configured accordingly. Thus, for example, the processor 40 may be configured to receive an indication of a key (e.g., from a user or a different component of the networking system or derived from some field in a network packet being transmitted, not shown), apply hashing functions, access the first and second hash tables (e.g., from the memory 50), obtain values from the hash tables, manipulate the values, and/or perform actions according to the values, as described above. In some cases, the processor 40 and the memory 50 may be embodied by the same apparatus 30, such as on a particular server, whereas in other cases the processor and the memory may reside on different components that are configured to communicate over a network, such as on two or more servers connected to a network (e.g., the Internet).

Accordingly, embodiments of the invention as described above use sub-keys derived from a key to store and/or access a value associated with the key via multiple hash tables. The systems and methods described herein allow the hash tables to be structured to have a width that is smaller than it would have otherwise been, had the hash tables been structured to accommodate the whole key, because the sub-keys are smaller than the whole key. As a result, more efficient utilization of the hash tables may be realized as described above.

Many modifications and other embodiments of the inventions set forth herein will come to mind to one skilled in the art to which these inventions pertain having the benefit of the teachings presented in the foregoing descriptions and the associated drawings. Although the figures only show simplified representations of keys, hash functions, hash tables, and entries as described herein, it is understood that the particular configurations, dimensions, and representations are for the purposes of explanation, and embodiments of the invention may be implemented with respect to various other types of keys, hash functions, hash tables, and entries and in various other hashing scenarios.

Moreover, although the figures and description above use the example of splitting a key into two sub-keys, in other embodiments the key may be split into more than two sub-keys, and certain types of keys may not be split at all. For example, in a case where three sub-keys were used, the first sub-key would be paired with a first identifier in a first hash table, and the first identifier would be concatenated with the second sub-key. The concatenated second sub-key would be paired with a second identifier in a second hash table, and the second identifier would in turn be concatenated with the third sub-key. The third sub-key would thus be paired with the value associated with the key in a third hash table.

Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of searching hash tables, comprising:
receiving a key, wherein, in response to a determination that a first width of the key is larger than a maximum width of a position of a first hash table, the key is split into at least a first sub-key and a second sub-key based on the first width and a second width of an action value associated with the key, wherein a third width of the second sub-key as a result of the split of the key corresponds to an average value of a difference between the first width and the second width, wherein the key is distributively stored using the first hash table and a second hash table, and wherein the action value is different than the key;
accessing the first hash table based on application of a first hash function to the first sub-key to locate the first sub-key in the first hash table;
in response to locating the first sub-key in the first hash table, returning an identifier stored in the first hash table associated with the first sub-key, wherein the identifier is a portion of an entry stored in the first hash table, wherein the entry comprises the first sub-key and the identifier, and concatenating the identifier stored in the first hash table with the second sub-key to create a concatenated second sub-key;
accessing the second hash table based on an application of a second hash function to the concatenated second sub-key to locate the concatenated second sub-key in the second hash table; and
in response to locating the concatenated second sub-key in the second hash table, obtaining the action value associated with the concatenated second sub-key.

2. The method of claim 1, wherein the entry is a first entry, wherein the second hash table comprises a second entry, wherein the second entry comprises the concatenated second sub-key and the action value.

3. The method of claim 1, wherein the first hash table is a cuckoo hash table.

4. The method of claim 1, wherein the key comprises one of an Internet Protocol (IP) address, a media access control (MAC) address, a Multiprotocol Label Switching (MPLS) label, a tunnel, a social Identifier (ID), or a name.

5. The method of claim 1, wherein a fourth width of the first sub-key corresponds to a difference between the first width and the third width.

6. A method of inserting a value into a hash table, the method comprising:
- in response to determining that a first width of a key is larger than a maximum width of a position of a first hash table, splitting the key into at least a first sub-key and a second sub-key based on the first width and a second width of an action value associated with the key, wherein a third width of the second sub-key as a result of the split of the key corresponds to an average value of a difference between the first width and the second width, wherein the key is to be distributively stored using the first hash table and a second hash table, and wherein the action value is different than the key;
- accessing the first hash table based on an application of a first hash function to the first sub-key;
- in response to accessing the first hash table, identifying a first open position of the first hash table and inserting the first sub-key into the first open position of the first hash table;
- generating an identifier to be associated with the first sub-key and inserting the identifier to be associated with the first sub-key into the first open position of the first hash table and associating the identifier with the first sub-key and inserting the identifier with the first sub-key into the first open position of the first hash table, wherein the identifier is a portion of an entry stored in the first hash table, wherein the entry comprises the first sub-key and the identifier;
- concatenating the identifier stored in the first hash table with the second sub-key to create a concatenated second sub-key;
- accessing the second hash table based on application of a second hash function to the concatenated second sub-key; and
- in response to accessing the second hash table, identifying a second open position of the second hash table, inserting the concatenated second sub-key and the action value into the second open position of the second hash table.

7. The method of claim 6, wherein the action value corresponds to an action to be performed.

8. The method of claim 6 further comprising, in response to identifying no first open position in the first hash table:
- removing an entry from a populated position of the first hash table to create a third open position;
- inserting the first sub-key into the third open position of the first hash table;
- inserting the identifier into the third open position of the first hash table;
- applying a different hash function to the removed entry;
- accessing a different hash table in response to applying the different hash function to the removed entry; and
- in response to accessing the different hash table, identifying an open position of the different hash table, inserting the removed entry into the open position of the different hash table.

9. The method of claim 6 further comprising, in response to identifying no second open position in the second hash table:
- removing an entry from a populated position of the second hash table to create a fourth open position;
- inserting the concatenated second sub-key into the fourth open position of the second hash table;
- inserting the action value into the fourth open position of the second hash table;
- applying a different hash function to the removed entry;
- accessing a different hash table in response to applying the different hash function to the removed entry; and
- in response to accessing the different hash table, identifying an open position of the different hash table, inserting the removed entry into the open position of the different hash table.

10. The method of claim 6, wherein the key comprises one of an Internet Protocol (IP) address, a media access control (MAC) address, a Multiprotocol Label Switching (MPLS) label, a tunnel, a social Identifier (ID), or a name.

11. The method of claim 6, wherein a fourth width of the first sub-key corresponds to a difference between the first width and the third width.

12. An apparatus comprising:
- at least one physical processor configured to split a key into at least a first sub-key and a second sub-key, based on a first width of the key and a second width of an action value associated with the key, and in response to a determination that the first width of the key is larger than a maximum width of a position of the first hash table from an array of hash tables, wherein a third width of the second sub-key as a result of the split of the key corresponds to an average value of a difference between the first width and the second width, and wherein the action value is different than the key; and
- at least one physical memory, wherein the at least one physical memory stores the array of hash tables, wherein the array of hash tables comprises at least the first hash table and a second hash table,
- wherein the first hash table is associated with a first hash function, wherein the first hash function is configured to store the first sub-key and an identifier associated with the first sub-key, wherein the first sub-key is a first portion of an entry of the first hash table,
- wherein the identifier is a second portion of the entry in the first hash table, wherein the second hash table is associated with a second hash function, and wherein the second hash table is configured to store the action value associated with the key and the second sub-key concatenated with the identifier.

13. The apparatus of claim 12, wherein a first available width of an entry of the first hash table and a second available width of an entry of the second hash table are selected such that a fourth width of the first sub-key plus a fifth width of the identifier is equal to a sixth width of the concatenated second sub-key plus the second width of the action value.

14. The apparatus of claim 12, wherein the array of hash tables are cuckoo hash tables.

15. The apparatus of claim 12, wherein the key comprises one of an Internet Protocol (IP) address, a media access control (MAC) address, a Multiprotocol Label Switching (MPLS) label, a tunnel, a social Identifier (ID), or a name.

* * * * *